United States Patent [19]
Hara et al.

[11] 4,273,984
[45] Jun. 16, 1981

[54] FLASH BUTT WELDING APPARATUS

[75] Inventors: Katsunori Hara; Toshihiko Baba; Takio Okuda, all of Amagasaki, Japan

[73] Assignee: Mitsubishi Denki Kabushiki Kaisha, Amagasaki, Japan

[21] Appl. No.: 945,009

[22] Filed: Sep. 22, 1978

Related U.S. Application Data

[63] Continuation of Ser. No. 763,116, Jan. 27, 1977, abandoned.

[30] Foreign Application Priority Data

Feb. 6, 1976 [JP] Japan .................................. 51-11886

[51] Int. Cl.³ .............................................. B23K 11/04
[52] U.S. Cl. ....................................... 219/97; 219/108
[58] Field of Search ............ 219/97, 100, 108, 130.51, 219/130.31, 130.32, 101

[56] References Cited

U.S. PATENT DOCUMENTS

| | | | |
|---|---|---|---|
| 3,330,933 | 7/1967 | Maklary | 219/130.51 |
| 3,484,578 | 12/1969 | Sciaky | 219/97 |
| 3,636,298 | 1/1972 | Risberg et al. | 219/108 |
| 3,894,210 | 7/1975 | Smith et al. | 219/130.51 |

FOREIGN PATENT DOCUMENTS 2325793 12/1974 Fed. Rep. of Germany ...... 219/130.31

Primary Examiner—C. C. Shaw
Attorney, Agent, or Firm—Oblon, Fisher, Spivak, McClelland & Maier

[57] ABSTRACT

A rectangular waveform voltage is applied between electrodes for welding by using a variable voltage-variable frequency type inverter as the power source for welding whereby the local short-circuit between workpieces can be immediately changed to the flash whereby the fine flash can be continuously generated to remarkably improve the quality of the welded part, and the voltage control can be attained without changing the voltage waveform.

5 Claims, 5 Drawing Figures

FLASH BUTT WELDING APPARATUS

This is a continuation of application Ser. No. 763,116 filed Jan. 27, 1977, now abandoned.

BACKGROUND OF THE INVENTION

1. Field of the Invention

The present invention relates to a novel flash butt welding method and a welding apparatus and more particularly it relates to a flash butt welding method and a welding apparatus having the specific means for applying voltage.

2. Description of the Prior Art

A single-phase AC power source having the commercial frequency (sine waveform) has been mainly used as the power source for the flash butt welding operation. When a local short-circuit of workpieces is caused near the zero of the voltage waveform of FIG. 1 (the shaded lines of FIG. 1) in the case of said power source, the voltage is low to limit the current passing through the short-circuited part whereby the short-circuit continues until the short-circuited part is scattered by raising the voltage without changing to the flash. During this period, the distance between the workpieces is shortened by moving the movable electrode whereby the effective area for current passing between the edge surfaces of the workpieces is increased, but the current per $mm^2$ is not increased. Accordingly, the edge surfaces of the workpieces are not heated as desired, and the flash is not formed. At last, a butting (the condition causing the short-circuit between the workpieces without the flash) may result.

Accordingly, it has been necessary to apply a high voltage (hereinafter referring to as the flash voltage) so as to heat the edge surfaces of the workpieces by increasing the current per $mm^2$.

When the flash voltage is high, the input power source capacity must be increased to cause a rough flash whereby the quality of the welded part is disadvantageously effected.

It has been proposed to decrease the flash voltage by using the DC waveform of the flash voltage in order to prevent the increase of the flash voltage. However, when the sectional area of the workpiece is large and a large output capacity of the power source is required, the effect of the inductance at the part of the rectifier can not be negligible to the impedance of the main circuit whereby the rising of the flash current is remarkably limited to deteriorate the function of the flash butt welding apparatus.

It has been also proposed to control the flash voltage by the phase control with a thyristor etc. when a sine waveform AC power source is used. FIG. 2 shows the voltage waveform in said case wherein the period applying no voltage (A-B) is prolonged to cause further disadvantage.

It has been disclosed the fact that a quality of a welded part is inferior in the flash welding operation by the phase controlled voltage in "Welding Journal Vol. 50, No. 5 1971 Pages 213 s to 221 s", "Effect of phase control during flashing on flash weld defects".

The conventional flash butt welding apparatus has the following disadvantages.

(1) A sine waveform AC power source is mainly used. The flash voltage should be increased for maintaining the flash with the sine waveform AC power source. The input power source capacity should be increased to cause a rough flash.

(2) The rise of the flash current is limited by the effect of the inductance of the rectifier in the case of a DC power source especially one having large capacity, whereby the flash is not preferably formed.

(3) The phenomenon of (1) is further remarkable by using the sine waveform AC power source under the phase control.

SUMMARY OF THE INVENTION

It is an object of the present invention to provide a novel flash butt welding apparatus which has not the above-mentioned disadvantages of the conventional apparatus and which use a rectangular waveform voltage to give substantially constant flash voltage at the edge surfaces of the workpieces and to give the impedance to be substantially the same as that of the single-phase AC power source.

Another object of the invention is to provide a flash butt welding method by applying an AC voltage having the rectangular waveform or near rectangular waveform between the electrodes for feeding the current to the workpieces.

The rectangular waveform voltage can be generated by a DC power source device and an inverter for converting the DC voltage of the DC power source device to the rectangular waveform voltage.

The DC power source device can be a battery and also can be a rectifying circuit for rectifying a AC input of the AC power source to the DC voltage with a thyristor, etc.

The inverter can be any type of inverter circuit for converting the DC input to a rectangular waveform AC voltage.

The optimum rectangular waveform AC voltage suitable for the welding operation can be fed by using the rectifying circuit as the DC power source device to control the output voltage of the rectifying circuit and using a thyristor type inverter as the inverter to control the output frequency, whereby the effective flash welding operation can be attained.

The novel flash butt welding method of the present invention which contributes the improvement of quality of the welded part and stability can be attained because it is possible to break the short-circuit to form the flash for a short time by applying the rectangular waveform voltage between the workpieces even though the short-circuit is caused at any time and the fine flash can be obtained.

The novel flash welding apparatus which has a simple structure to output the optimum flash voltage suitable for various welding conditions and which is economical can be obtained.

Various objects, features and attendant advantages of the present invention will be fully appreciated as the same becomes better understood from the following detailed description of the present invention.

BRIEF DESCRIPTION OF THE DRAWINGS

In the drawings, like references designate identical or corresponding parts.

DETAILED DESCRIPTION OF THE PREFERRED EMBODIMENTS

Figure 3:
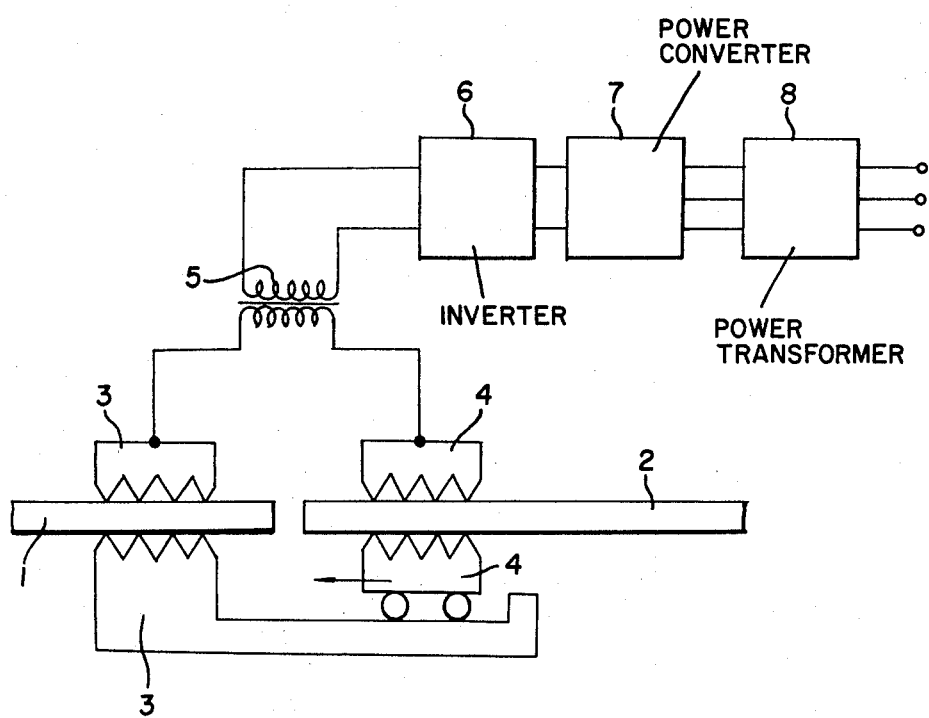
FIG. 3 is a schematic diagram of a flash butt welding apparatus of the present invention.

FIG. 3 is a schematic diagram of one embodiment of the flash butt welding apparatus. In FIG. 3, the reference numerals (1), (2) designate workpieces which will be welded by the flash butt welding method; (3) designates a fixed electrode for feeding the flash current; (4) designates a movable electrode for feeding the flash current; (5) designates a transformer for welding which transforms the rectangular waveform voltage so as to give the low voltage-large current which is required for the flash butt welding; (6) designates an inverter having a thyristor for converting the DC power input to the rectangular waveform output; (7) designates a power converter for converting the AC power input to the constant voltage DC output (hereinafter referring to as the constant voltage DC power source device) and (8) designates a power transformer.

In the apparatus of the present invention, the workpieces (1), (2) are set between the electrodes (3), (4) and the rectangular waveform voltage formed by the inverter (6) the DC power source (7) and the power transformer (8) is applied through the transformer for welding (5) to the electrodes (3), (4).

When the movable electrode (4) is moved in the direction of the fixed electrode (3), the projecting parts of the facing edge surfaces of the workpieces (1), (2) cause a concentrated short-circuit current to pass whereby the metal at the short-circuit part is heated by Joule heat to melt and to flash it. The movable electrode (4) is gradually and continually moved in the direction of the fixed electrode (3), to produce a series of successive meltings and flashings at the facing edge surfaces of the workpieces (1), (2). After sufficient heating of the edge surfaces has occurred, the workpieces are pressed together to complete the butt weld. The direction of motion of the movable electrode is constant throughout the entire welding operation.

Figure 1:
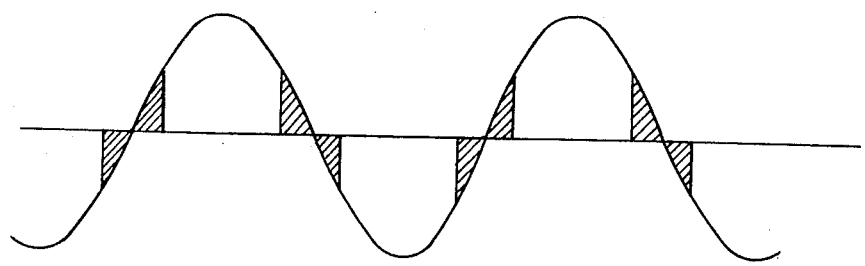
FIG. 1 shows a flash voltage waveform of a single-phase sine waveform AC voltage applied to the conventional flash butt welding apparatus.
Figure 2:
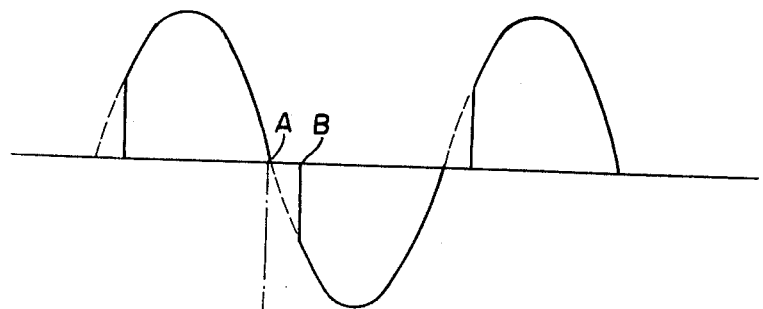
FIG. 2 shows a phase control waveform of a single-phase AC voltage applied to the conventional flash butt welding apparatus.
Figure 4:
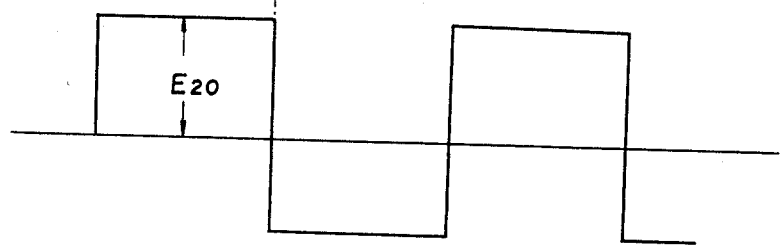
FIG. 4 shows a rectangular waveform using in the apparatus of the present invention.

In the present invention, the rectangular waveform of FIG. 4 is used as the waveform of the flash voltage, whereby the voltage $E_{20}$ is always applied between the electrodes. Even though the short-circuit is formed between the workpieces at any time, it is easy to break the short-circuit and to cause the flash for a short time.

The breaking of the short-circuit for a short time causes the formation of a fine flash because of a small distance for moving the movable electrode (4) to prevent the increase of effective area of short-circuit, whereby the quality of the welded part is improved.

Figure 5:
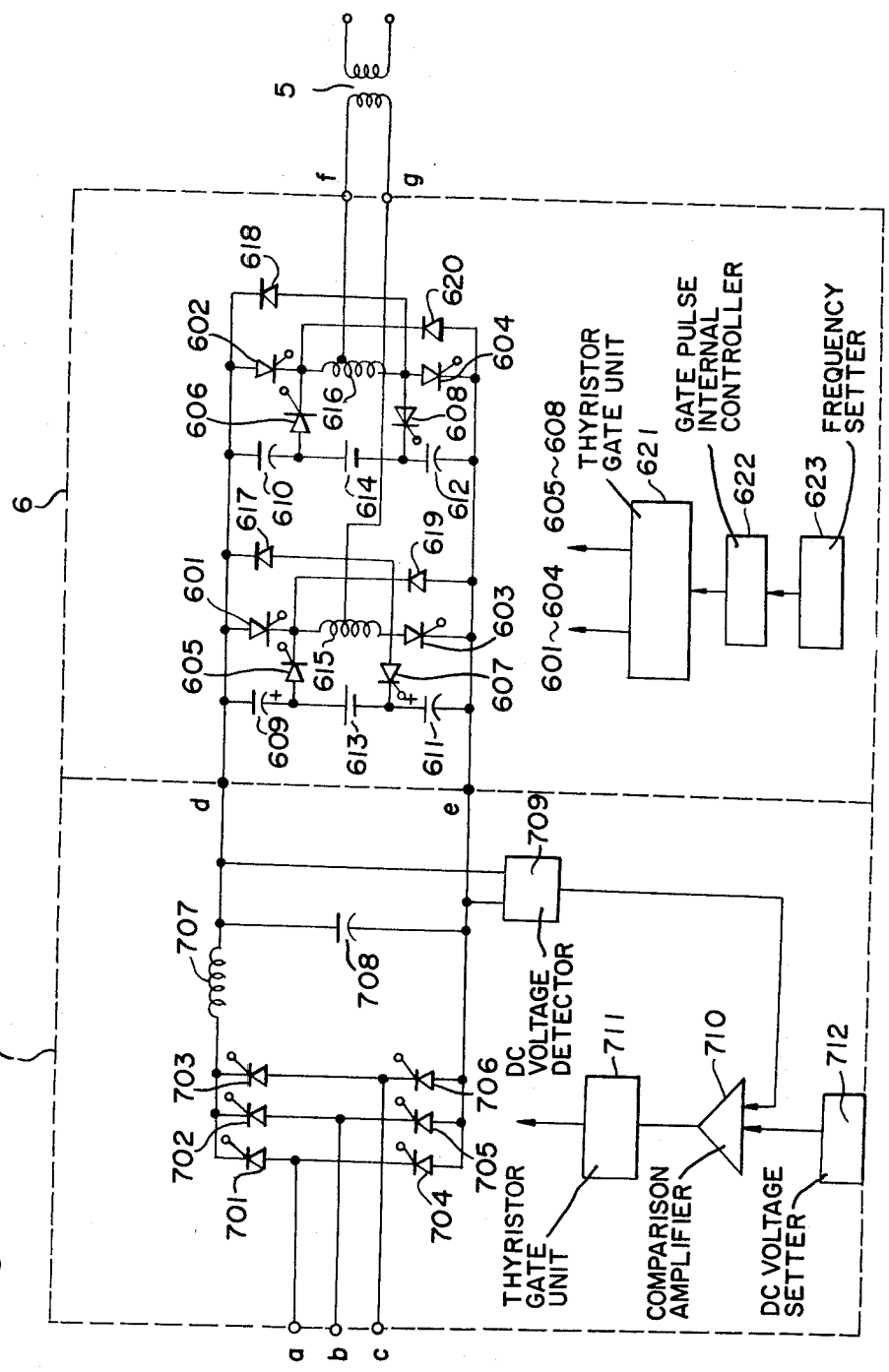
FIG. 5 is a connection diagram of one embodiment of a device for generating the rectangular waveform voltage in FIG. 3.

FIG. 5 shows one embodiment of the circuit for generating the rectangular waveform voltage which is used in the method of the present invention wherein the same references designate identical or corresponding parts to those of FIG. 3.

In FIG. 5, the reference numerals (601) to (604) designate main thyristors; (605) to (608) designate commutation auxiliary thyristors; (609) to (612) designate commutation capacitors; (613) to (614) designate commutation auxiliary power sources; (615) and (616) designate commutation reactors; (617) to (620) designate feedback diodes; (621) designates a thyristor gate unit; (622) designates a gate pulse internal controller and (623) designates a frequency setter; (701) to (706) designate rectifying thyristors; (707) designates a smoothing reactor; (708) designates a smoothing condenser; (709) designates a DC voltage detector; (710) designates a comparison amplifier; (711) designates a thyristor gate unit and (712) designates a DC voltage setter.

The inverter (6) and the DC power source device (7) have the above-mentioned structure and the three-phase AC voltage of the transformer (8) is applied to the input terminals a, b, and c of the DC power source device (7). The three-phase AC input applied to the terminals a, b, and c, is rectified in the three-phase all wave rectification by the rectifying thyristors (701) to (706) and is smoothed by the smoothing reactor (707) and the smoothing condenser (708) and is input to the inverter (6). When the DC voltage is applied, the alternate firing of each pair of the main thyristors (601) and (604) or (602) and (603) in the main thyristors (601) to (604) is controlled whereby the rectangular waveform AC voltage can be applied between the terminals f, e.

The DC voltage applied between the terminals d, e is detected by the voltage detector (709) and is compared with the set value of the DC voltage setter (712) and amplified by the comparison amplifier (710), and the firing phases of the rectifying thyristors (701) to (706) are controlled through the gate unit (711) by the amplified voltage. Accordingly, the output voltage of the DC power source device (7) can be continuously changed as desired, by the control signal of the DC voltage setter (712).

One embodiment of the commutation operation in the inverter (6) will be illustrated.

When the main thyristor (601) is in the ON state and the load current is fed through the terminal g, the commutation condensers (609), (611) are charged in the polarity shown in FIG. 5. When the auxiliary thyristor (605) is fired for extinguishing the main thyristor (601), the discharge current of the commutation condenser (609) cancels the load current and flows through (605)→(615)→(617)→(609), and the commutation condenser (609) is charged in the opposite polarity by the resonance of the commutation condenser (611) and the commutation reactor (615) and the stored charge is used for the extinguishing of the next main thyristor (603). When the reverse charging is completed, the auxiliary thyristor (605) is spontaneously extinguished. When the main thyristor (601) is extinguished, the main thyristor (603) is fired to complete the commutation.

As it is clear from the above-description, the width of the rectangular waveform appearing between the output terminals f, g of the inverter (6) is decided by the intervals of the pulse for firing the main thyristor (601) and the pulse for extinguishing the main thyristor (601). Accordingly, the output frequency of the inverter (6) can be controlled as desired by controlling the gate pulse intervals for the main thyristors (601) to (604) and the auxiliary thyristors (605) to (608) by a frequency setter (623), a pulse interval controller (622) and a gate unit (621).

The following advantages can be attained by using the rectangular waveform generating circuit of FIG. 5 as the power source for welding.

When the temperature of the workpieces is low at the initial stage of the welding operation, the generation of the flash is difficult. Accordingly, it is customary to employ a variable voltage system wherein the voltage is raised at the initial stage of the flash and the voltage falls at the time of forming the stable flash.

In the conventional method, the control of the voltage has been attained by a method of switching taps in the primary winding of the transformer for welding or a phase control of thyristor etc. In the former method, the flash is interrupted at the time of switching the taps. In the latter method, the disadvantageous effect is caused for the welding operation as described above.

In accordance with the apparatus of the present invention, the DC voltage can be continuously varied as desired to overcome the above-mentioned disadvantages.

When external trouble such as variation of the power voltage is caused, the flash voltage is varied depending upon the variation to cause a disadvantageous effect for uniformity of the welding result.

In the conventional method, the constant voltage control has been conducted by the phase control of the thyristor, whereby the abovementioned disadvantage is caused.

In accordance with the apparatus of the present invention, the output voltage of the DC power source (7) is controlled so as to keep the constant input voltage of the inverter (6) regardless of the variation of the power voltage, whereby the disadvantage is not found.

In accordance with the apparatus of the present invention, the frequency of the voltage applied to the transformer for welding can be easily varied by the inverter (6) whereby the weight of the transformer for welding (5) can be minimized by selecting a suitable frequency for the welding phenomena or increasing the frequency.

The rectangular waveform generating circuit of FIG. 5 shows only one embodiment of the invention. In the apparatus of the invention, various types of the rectifying circuits and the inverter circuits can be used as the DC power source device (7) and the inverter (6).

It is also possible to use a battery as the DC power source device.

As illustrated above with one embodiment, in accordance with the flash butt welding method and the apparatus of the present invention, the novel flash butt welding method and the apparatus for accomplishing the following excellent results can be obtained by generating the rectangular waveform AC voltage using a variable frequency inverter having thyristors etc., and a DC power source device having a rectifier for rectifying a three-phase or single-phase AC voltage into a variable DC voltage for feeding to the inverter, and applying the rectangular waveform AC voltage between the electrodes.

(i) A fine flash can be obtained by applying the rectangular waveform voltage between the workpieces whereby the flash voltage can be decreased to reduce the input power source capacity thereby contributing to stable quality of the welded part.

(ii) The impedance of the main circuit can be substantially the same as that in the single-phase sine waveform AC power source case by using a thyristor type inverter as the inverter.

(iii) The level of the flash voltage can be varied as desired by changing the reference signal of the constant voltage DC power source.

(iv) The flash voltage can be kept constant despite external trouble such as the variation of the power voltage.

(v) The frequency suitable for the welding phenomena can be selected and the weight of the transformer for welding can be decreased by increasing the frequency as the frequency of the power source is variable.

(vi) The input can be the same for the three-phase equilibrium load or the single-phase load because the rectangular waveform single-phase AC voltage is given after converting to the DC voltage even though a three-phase AC voltage is used as the power source.

What is claimed is:

1. A flash butt welding apparatus for welding the opposing ends of two workpieces together which comprises:
   DC power source means for supplying a DC output voltage;
   inverter means coupled to said DC power source means for converting the DC output voltage of said DC power source means to a rectangular waveform AC voltage;
   first electrode means for electrically contacting one of said work pieces and movable therewith;
   second electrode means for electrically contacting the other of said workpieces, said second electrode means being stationary;
   a welding transformer having at least one primary winding and at least one secondary winding, the primary winding of said transformer being connected to the output of said inverter means and the secondary winding of said transformer being connected between said first electrode means and said second electrode means such that the rectangular waveform AC voltage output of said welding transformer appears between said first and said second electrode means;
   means for gradually and continually moving said first electrode means and the workpiece contacted by said first electrode means toward said second electrode means and said other workpiece contacted by said second electrode means to cause a series of successive partial contacts between portions of the opposing ends of said two workpieces such that an AC current from said transformer flows through each area of partial contact, said AC current operating to successively melt each area of partial contact and to successively scatter each of said melted areas as flash, said flash scattering forming gaps in the opposing ends of said workpieces resulting in the formation of electric arcs between said workpieces, and for rapidly pushing said workpieces together to complete the butt weld when the temperature of the opposing ends of said workpieces has been raised sufficiently by said successive melting and flashing, the direction of motion of said workpieces under control of said moving means being constant throughout the flash butt welding operation.

2. A flash butt welding apparatus according to claim 1, wherein said DC power source device includes a rectifier for rectifying the AC input to give a DC output.

3. A flash butt welding apparatus according to claim 2, wherein said rectifier can feed variable DC outputs.

4. A flash butt welding apparatus according to claim 3, wherein the rectangular waveform output voltage of said inverter means is of variable frequency.

5. A flash butt welding apparatus according to claim 1, wherein said inverter can feed the rectangular waveform AC voltage having a variable frequency.

* * * * *